Sept. 8, 1936.  E. G. GOODWIN  2,053,989
BOLSTER DAMPER
Filed April 18, 1929  4 Sheets-Sheet 1

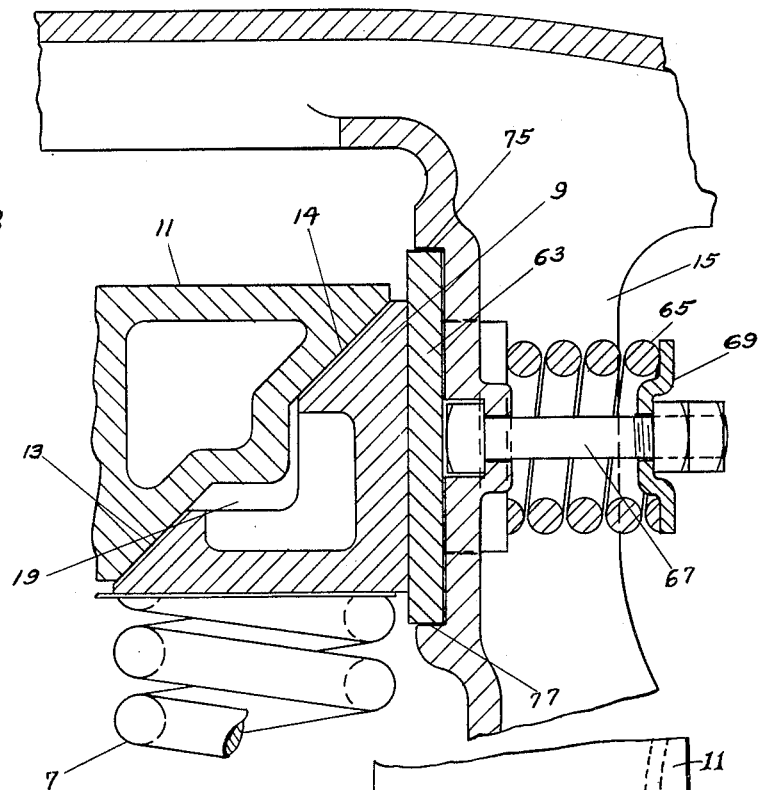
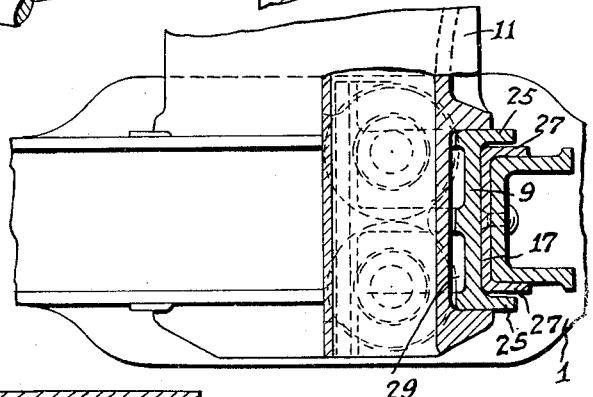
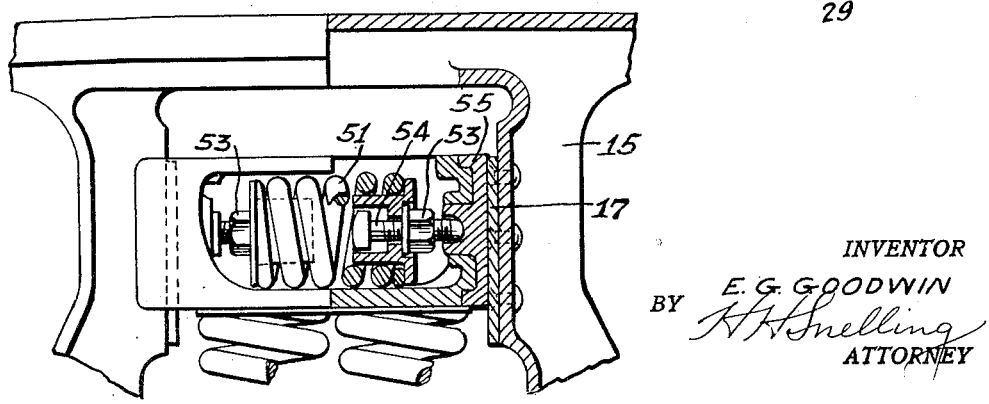

INVENTOR
E.G. GOODWIN
BY H.H. Snelling
ATTORNEY

UNITED STATES PATENT OFFICE 2,053,989

BOLSTER DAMPER

Ernest G. Goodwin, Pelham, N. Y., assignor to Standard Coupler Company, New York, N. Y., a corporation of New Jersey Application April 18, 1929, Serial No. 356,253
Renewed July 11, 1932

12 Claims. (Cl. 105—193)

This invention relates to trucks for railroad cars, and more particularly to the usual freight car type of truck.

One of the objects of the invention is the provision of a truck having means to absorb energy caused by the vertical oscillation of the parts supported by the truck springs so as to minimize, or eliminate, the accumulative roll of car bodies at critical train speeds wherein the rocking time interval which is a function of the height of the center of gravity synchronizes with the time interval of passing of rail joints or other low spots in the track when low spots or rail joints are staggered. This accumulative rocking is particularly detrimental in that it rolls springs solid, setting up abnormal stresses in all supporting members of both the truck and the car body, resulting in premature destruction of these parts, particularly the truck springs and the truck frames.

Another object of the invention is to absorb energy both while the spring is being compressed and during the recoil. A still further object and advantage of the invention is to provide the above in an inexpensive way and of simple construction, requiring a minimum of maintenance, providing a device that can readily be dealt with by the average railroad car repairer. The above and other objects and advantages will appear from the following description, taken in connection with the accompanying drawings in which:

Figure 2 is a half plan view in section on line 2—2, Figure 1.

Figure 5 is a further modification, using an auxiliary spring.

Figure 8 is a further modified form.

Figure 1:
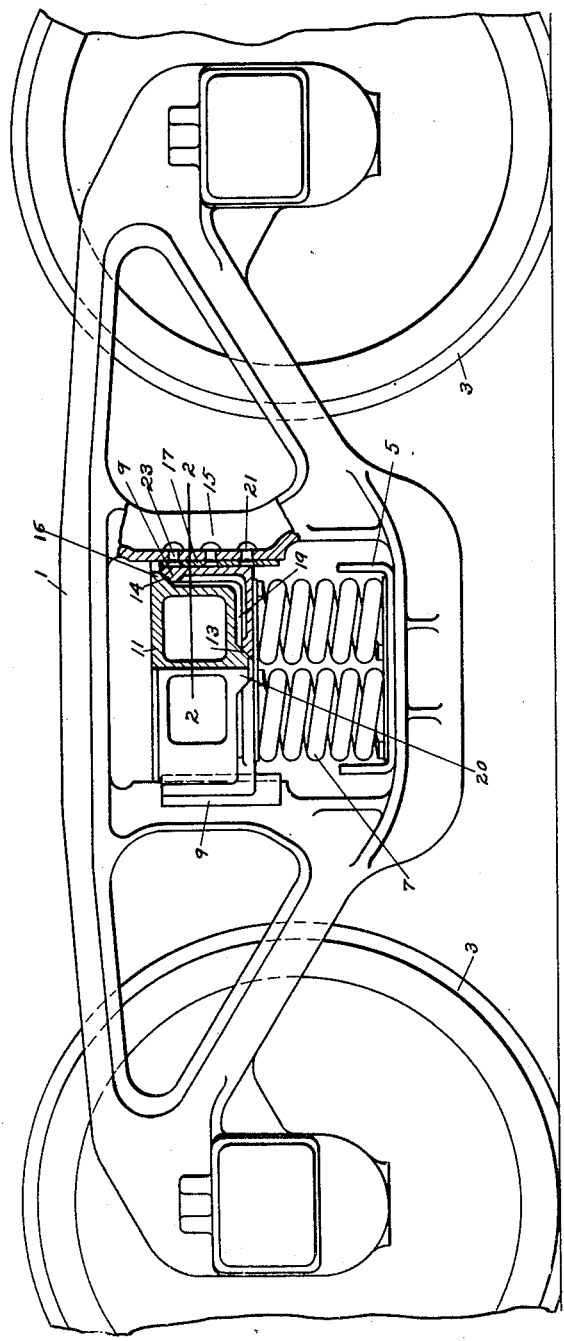
Figure 1 is a side elevation partly in section of a truck showing the relative position of the truck bolster and its frictional engagement with the frame.

In the form illustrated in Figures 1 and 2, which is probably the type best adapted to general use, I have illustrated the invention as applied to a simple four wheel truck but obviously the invention is not limited to the simple forms of truck. In this figure the truck is composed of two side frames 1 which are supported on the wheels 3 and axles thru journal bearings following any accepted type. The spring plank 5, which serves as a tie between the opposite side frames 1 which support it, supports the truck springs 7 which in ordinary practice react directly against the bolster but in accordance with the present invention intermediate members 9 are positioned between the springs 7 and the bolster 11 in order to create a side thrust against the side frame columns 15 in order to check both upward and downward movement of the bolster end.

These intermediate members may take a variety of forms of which a simple type is illustrated as the shoe 9 which as seen in Figure 1 has a generally L-shaped cross section, at the lower and inner end of which is a bearing surface 13 arranged at approximately 45° to both horizontal and vertical and at the upper edge of this shoe is a similar bearing surface 14 somewhat narrower from side to side as it is received in the usual recess of the truck bolster 11 which however is slightly modified to accommodate the novel elements of the present invention. In so doing, however, care has been taken so that the slightly altered side frames of the truck may cooperate readily with a bolster of standard design and that the bolster of this invention may operate readily in an ordinary truck frame.

The bolster is recessed as at 19 to provide for an outward and upward movement of the shoes to compensate for surface wear and at the center of the bottom of the bolster I provide a longitudinal downwardly directed wedge 20 which engages and cooperates with the lower bearing faces of the bearing surface 13. At each side the bolster is also flared outwardly forming wedging surfaces 16 alined with and having frictional engagement with the upper angular bearing surfaces 14 of the shoes. It is convenient to increase slightly the spread of the standard side frame columns and to add a removable liner 17 the outer dimensions of which will agree with the standard horizontal cross section dimensions of the side frame column.

The downward thrust of the bolster creates a horizontal thrust directed toward the rivet 21 by reason of the relation between the central wedge 20 of the bolster and the angular bearing surface 13 of the shoe and in similar manner a horizontal thrust toward the rivet 23 is created by the coaction of the wedging flange 16 of the bolster and since the shoe 9 is a sufficiently stiff member the bearing area is continued throughout the entire outward face of the shoe.

In order to prevent excessive horizontal movement of the truck bolster 11 in the side frame 1 the shoes 9 are each provided with two outwardly extending flanges 25 which engage the similarly extending flanges 27 of the liner 17. The recess 29 in the truck bolster is greater than standard practice but the similarly shaped recess in the shoe 9 is of the horizontal cross section of the standard truck bolster recess, so as to fit a standard truck frame.

In this embodiment of the invention the horizontal pressure exerted by the shoes against the liners 17 removably secured to the side frames of the truck is substantially proportional to the load but in practical tests of the device this simple form appears to be equally as effective as the more complicated types in which the horizontal pressure is practically constant and of a predetermined amount. It is particularly to be noted that since the device works on both the downward stroke and on the recoil a tendency to roll is eliminated because of the damping force which constantly urges the moving parts to come to rest so that the life of the springs are greatly increased by eliminating the tendency to "set" or break which is created whenever the springs are allowed to go "solid".

Figure 3:
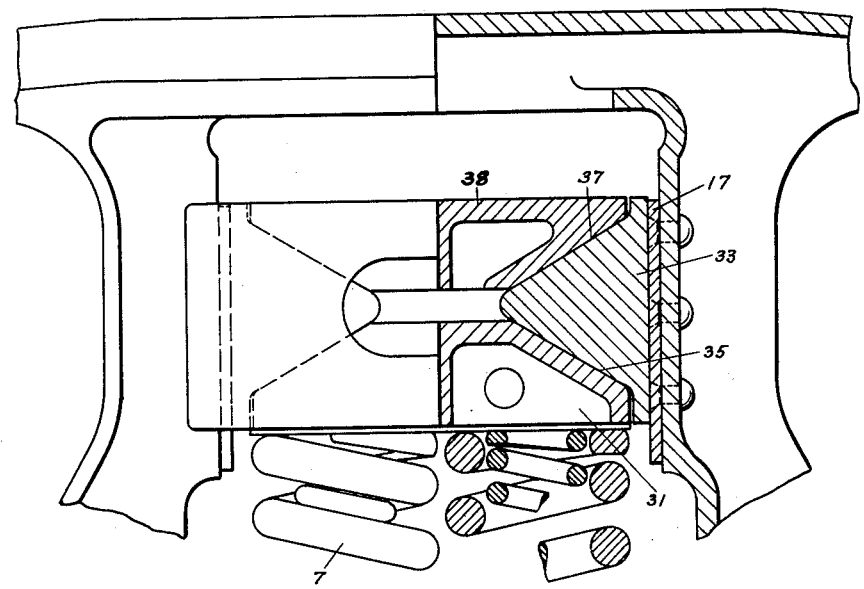
Figures 3 and 4 are modified forms of Figure 1.

In the modified form shown in Figure 3 the side frames and the liners 17 are as illustrated in Figure 1 but in this case a spring seat 31 is provided which reacts against the truck springs 7 and supports the bolster 38 thru shoes 33 one or both surfaces of which are other than horizontal in order to create the desired horizontal pressure. The spring seat surface 35 is slightly more horizontal than 45° and the bolster engaging surface 37 is sloped at the same angle so as to cause the shoe to have a vertical cross section substantially that of an isosceles triangle. In the form illustrated the cross section triangle is substantially equilateral, the apex angles being roughly 60°.

Figure 4:
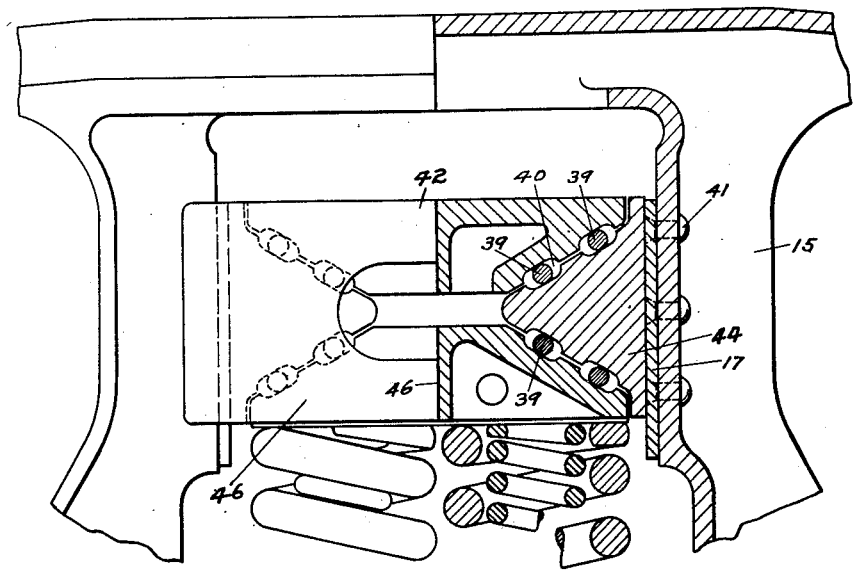

The same construction is illustrated in Figure 4 save that in this modified form rollers 39 are inserted in pockets 40 formed by alined grooves in the bolster 42 and the shoe 44, and similar pockets 40 are provided between the shoe 44 and the spring seat 46. While I prefer to have the rollers 39 both between the shoe and the bolster and between the shoe and the spring seat either may be omitted. The side frame column liner 17 is anchored to the side frame column 15 by means of rivets 41 to prevent relative vertical movement between these two members, relative horizontal movement being prevented by the flanges 27 (see Figure 2).

In the three types just described the horizontal urge of the friction has been derived from the reaction of the usual truck springs by employing a sloping surface for supporting the vertical load and the urge is therefore proportional to the load carried except for the effect of friction between the bolster, the shoes and the spring seats. In Figure 5 the horizontal thrust is made independent of the load and is provided by the use of an auxiliary spring 51 which is carried in the end of the bolster. The pressure exerted by the spring may be adjusted by means of the nuts 53 on the bolts 54 and this arrangement can also be used to compensate for wear. It will be noted that in this type the horizontal thrust is constant and is entirely irrespective of the vertical load, acting both on the downward stroke and on the recoil. The friction shoes 55 operate in exactly the same manner against the liner 17 as in the previous forms.

Figure 7:
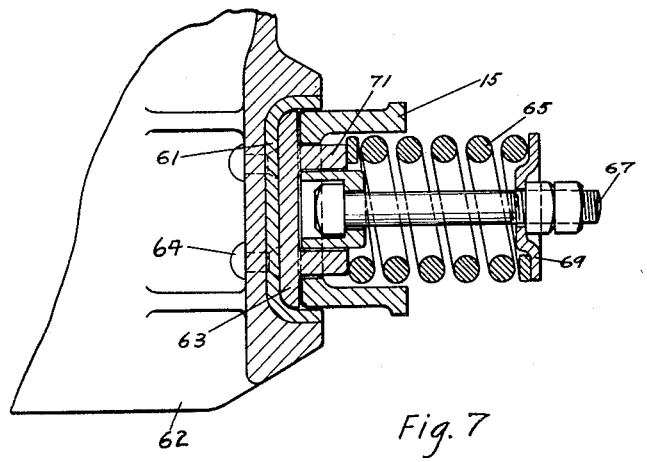
Figures 6 and 7 are sectional elevations and plan views showing another modification employing auxiliary springs.
Figure 6:
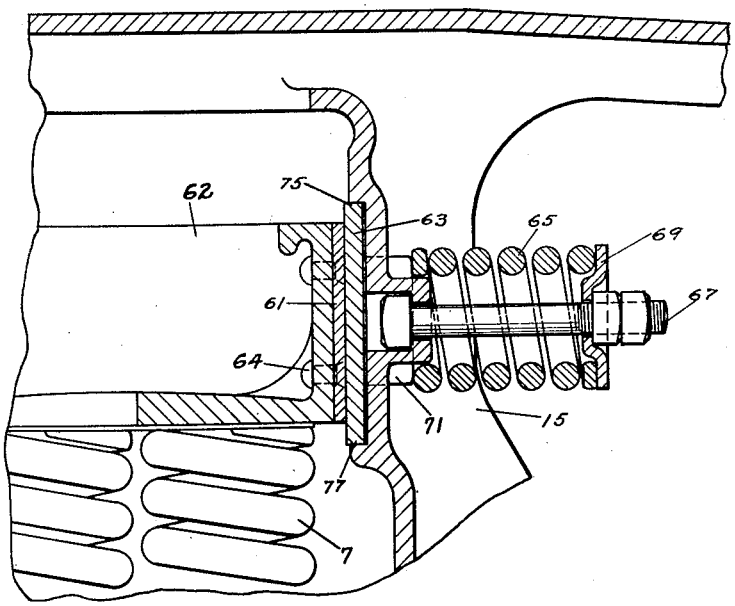

In Figures 6 and 7 the arrangement is reversed and a stationary liner 61 is removably secured to the bolster 62 by means of rivets such as 64 while the friction shoe 63 and the pressure creating spring 65 are mounted on the side frame column by means of a bolt 67 and a washer 68 mounted thereon. The projection 71 extending integrally from the friction shoe serves both as a seat for the spring 65 and as means to resist vertical movement of the shoe with respect to the side frame 15.

The individual modifications illustrated may, if desired, be combined as for example, in Figure 8 in which the wedging action of Figures 1 and 2 is added to the friction shoe plate of Figures 6 and 7, thus obtaining the benefit of constant horizontal thrust when cars are loaded to a predetermined amount and proportional to the load when loaded heavier.

From the foregoing description, taken in connection with the drawings, it will be evident that I have provided an exceedingly simple and rugged energy-absorbing mechanism. It will be noted that it operates with every vertical movement of the bolster ends and will materially retard vertical oscillation of the parts carried by the truck springs and will reduce, if not limit altogether, any accumulative rocking of car bodies at critical train speeds.

What I claim is:

1. A bolster having a central wedge at each end on the bottom face and having wedging flanges at each upper side of each end.

2. In a truck, a side frame having columns for guiding a bolster, truck springs carried by said frame for supporting a bolster, a plurality of shoes frictionally engaging the side frame and embracing the columns thereof, wedging means, carried in part by said shoes, for forcing said shoes apart as the load on the bolster increases, and spring pressed plates interposed between the shoes and the frame to add a constant pressure irrespective of the load.

3. A friction shoe to be positioned between a bolster and the friction column of the side frame of a truck, U-shaped in horizontal cross section to embrace the column and L-shaped in vertical cross section to receive the lower outer corner of the bolster.

4. In a truck, a side frame having a column, a bolster-supporting, vertically-positioned spring seated on the side frame, a shoe resting upon said spring and in frictional engagement with the column, said shoe having flanges for engaging the sides of the column, a bolster end resting upon the shoe, and alined coacting wedging surfaces on the bolster and the shoe for transmitting vertical pressure on the bolster to horizontal pressure between the shoe and column.

5. In a truck, a side frame, a bolster, springs for supporting the bolster on the truck, a spring seat, and means frictionally engaging the seat, the bolster, and the side frame, the engagement of the bolster and spring seat with said means being along sloping surfaces.

6. The device of claim 5 in which the means is a shoe having a triangular vertical cross section.

7. The device of claim 5 in which the means is a shoe having a cross section substantially that of an equilateral triangle.

8. The device of claim 5 in which the means is a shoe having a vertical face to engage the frame and having sloping faces to engage the seat and the bolster.

9. In a railway truck, a side frame having parallel columns, a bolster end vertically movable between the columns with space laterally on each side between the bolster and the adjacent column, a bolster supporting spring group carried by the side frame, two friction shoes each supported by a spring of the group and having a vertical face frictionally engaging the column and a sloping face extending downwardly and inwardly toward a vertical plane thru the centerline of the bolster, and sloping walls on the bolster end for wedging the shoes apart to cause the shoes to frictionally engage the columns to dampen the oscillations of the bolster, the entire bolster load transmitted to said shoes passing through the wedging surfaces.

10. In a car truck, a side frame, a bolster, springs on said side frame for supporting said bolster, friction means on said side frame, friction shoes engageable with said means, and wedging means on said bolster comprising spaced, oppositely sloping bolster walls for urging said shoes against said friction means to dampen vibrations of said springs.

11. In a car truck, a side frame, a bolster, springs on said side frame for supporting said bolster, friction means on said side frame, friction shoes engageable with said means, the sides and bottom of the bolster in the zone of said shoes being joined by sloping walls presenting wedging surfaces for urging said shoes against said friction means to dampen vibrations of said springs.

12. In a car truck, a side frame, a bolster, springs on said side frame for supporting said bolster, friction means on said side frame, friction shoes engageable with said means, and means associated with the side walls and bottom walls of said bolster and comprising sloping walls presenting wedging surfaces for urging said shoes against said friction means to dampen the vibration of said springs.

ERNEST G. GOODWIN.